Sept. 19, 1967 J. ADAMSKI 3,342,524
CONVERTIBLE TOP MECHANISM
Filed Feb. 14, 1966 12 Sheets-Sheet 4
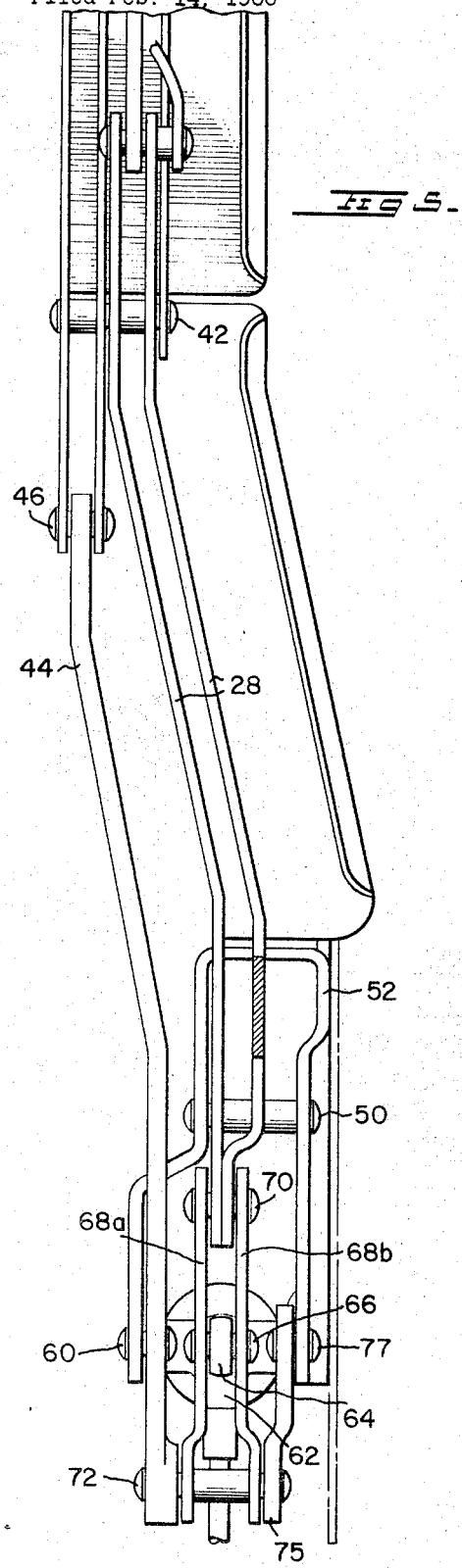
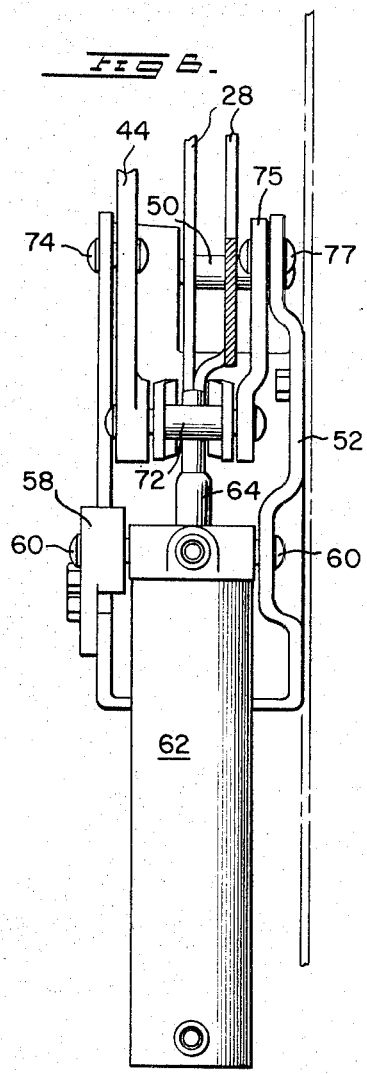
INVENTOR
JOSEPH ADAMSKI
BY *Stowell & Stowell*
ATTORNEYS

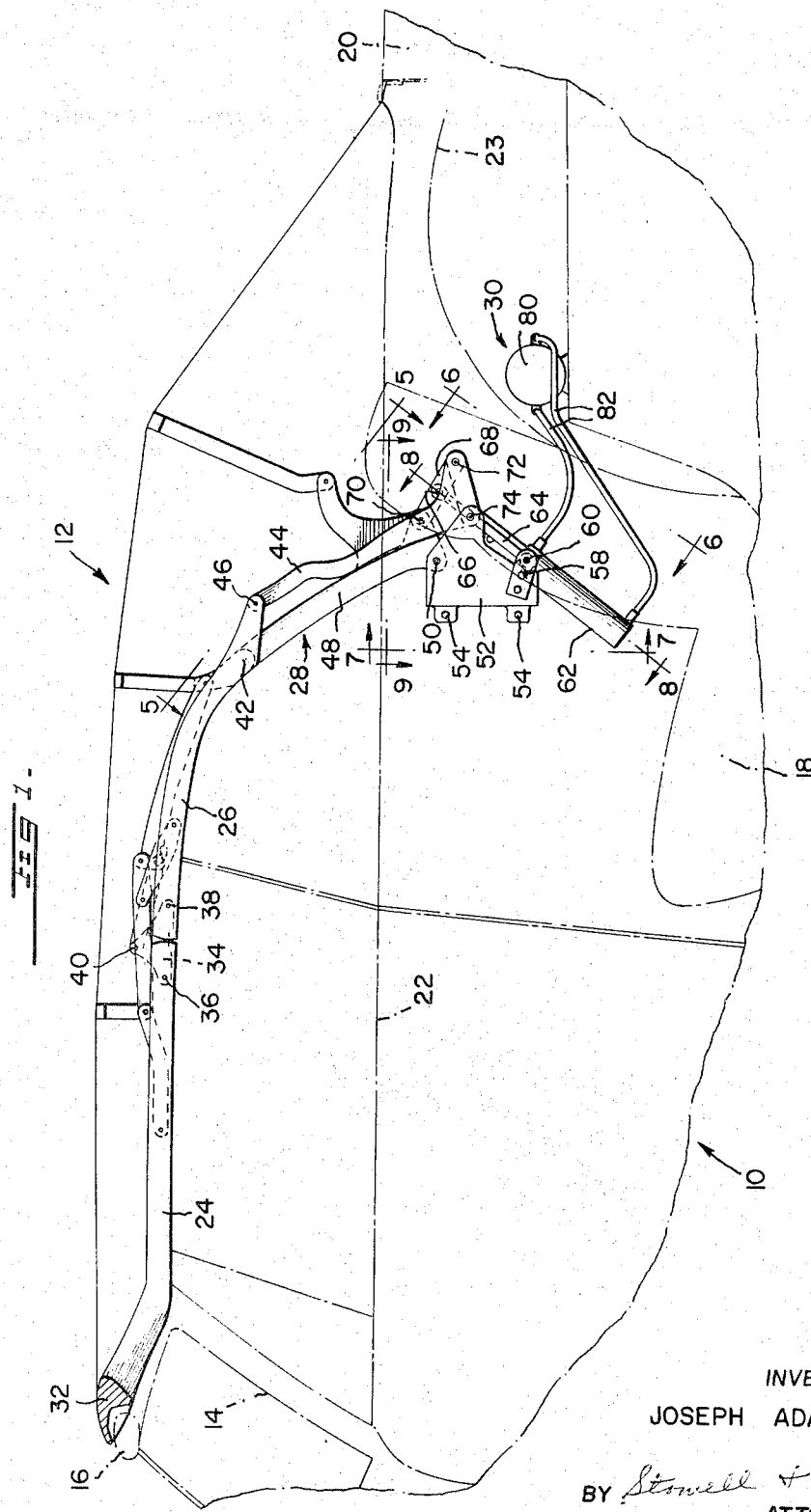

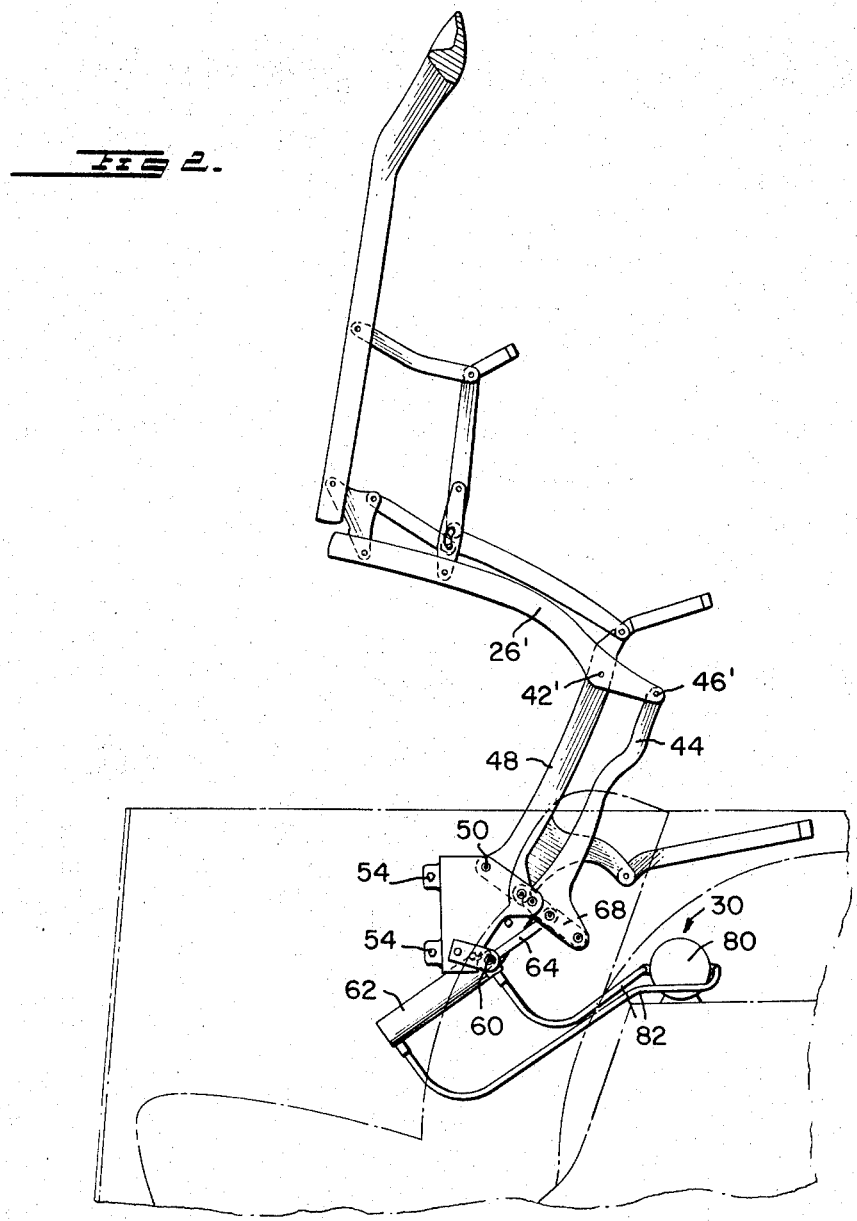

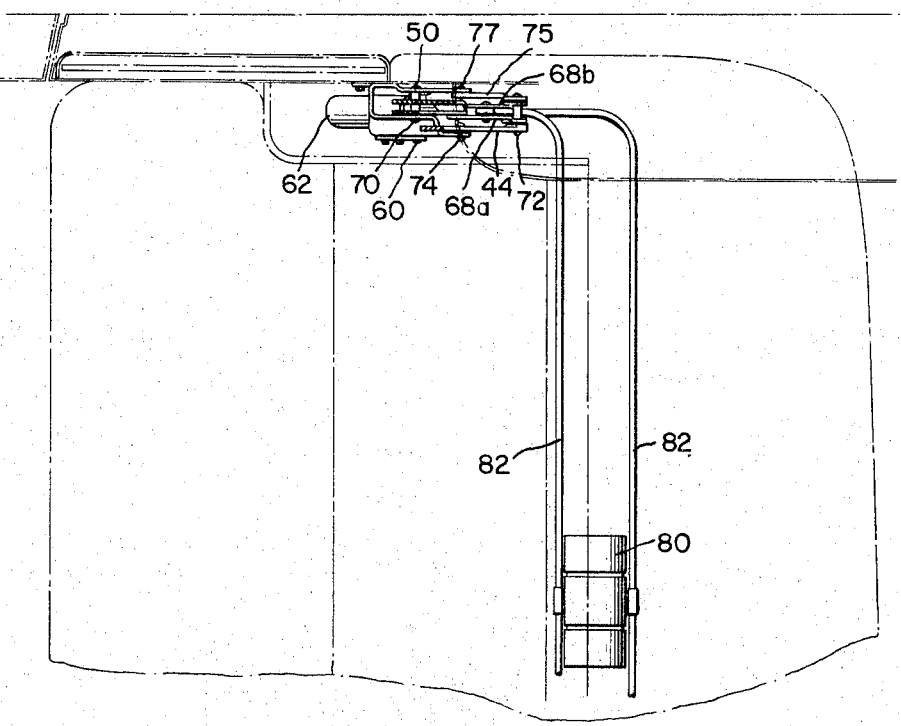
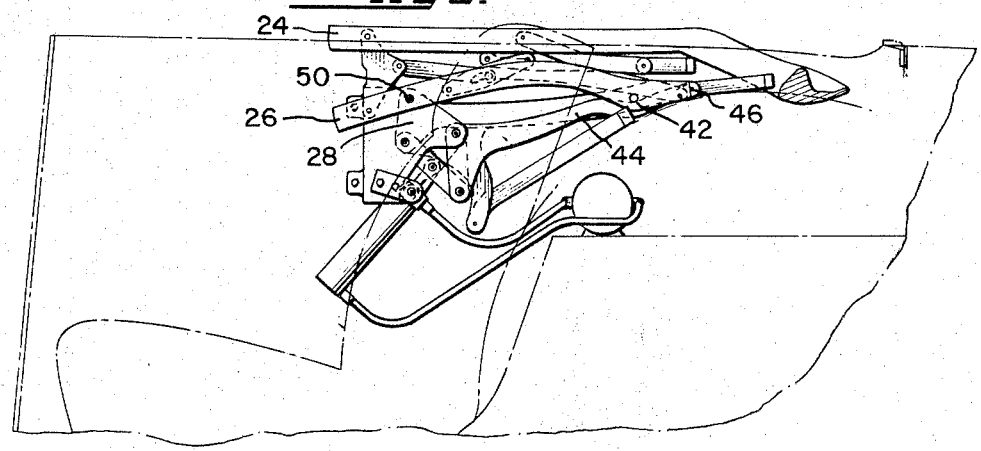

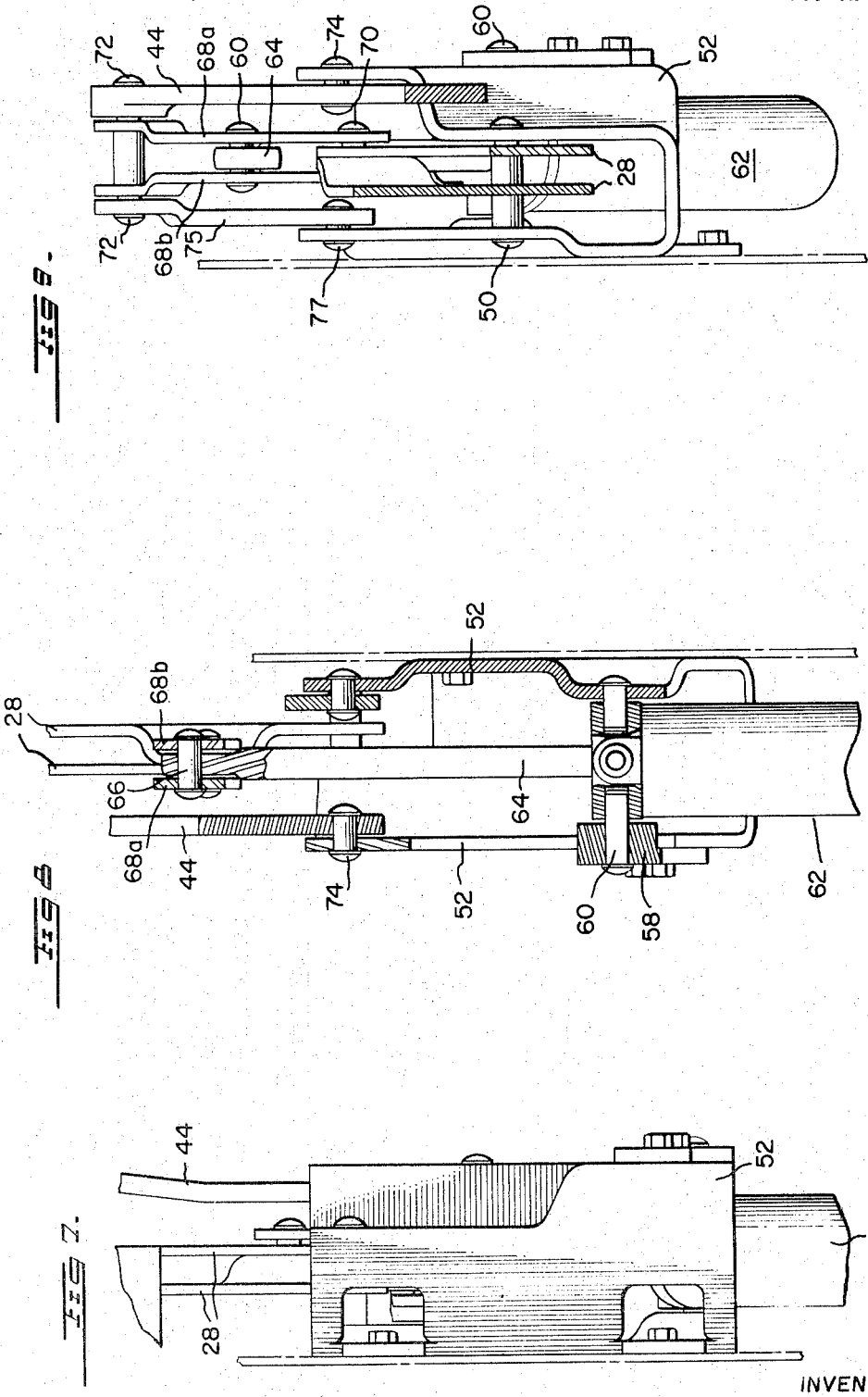

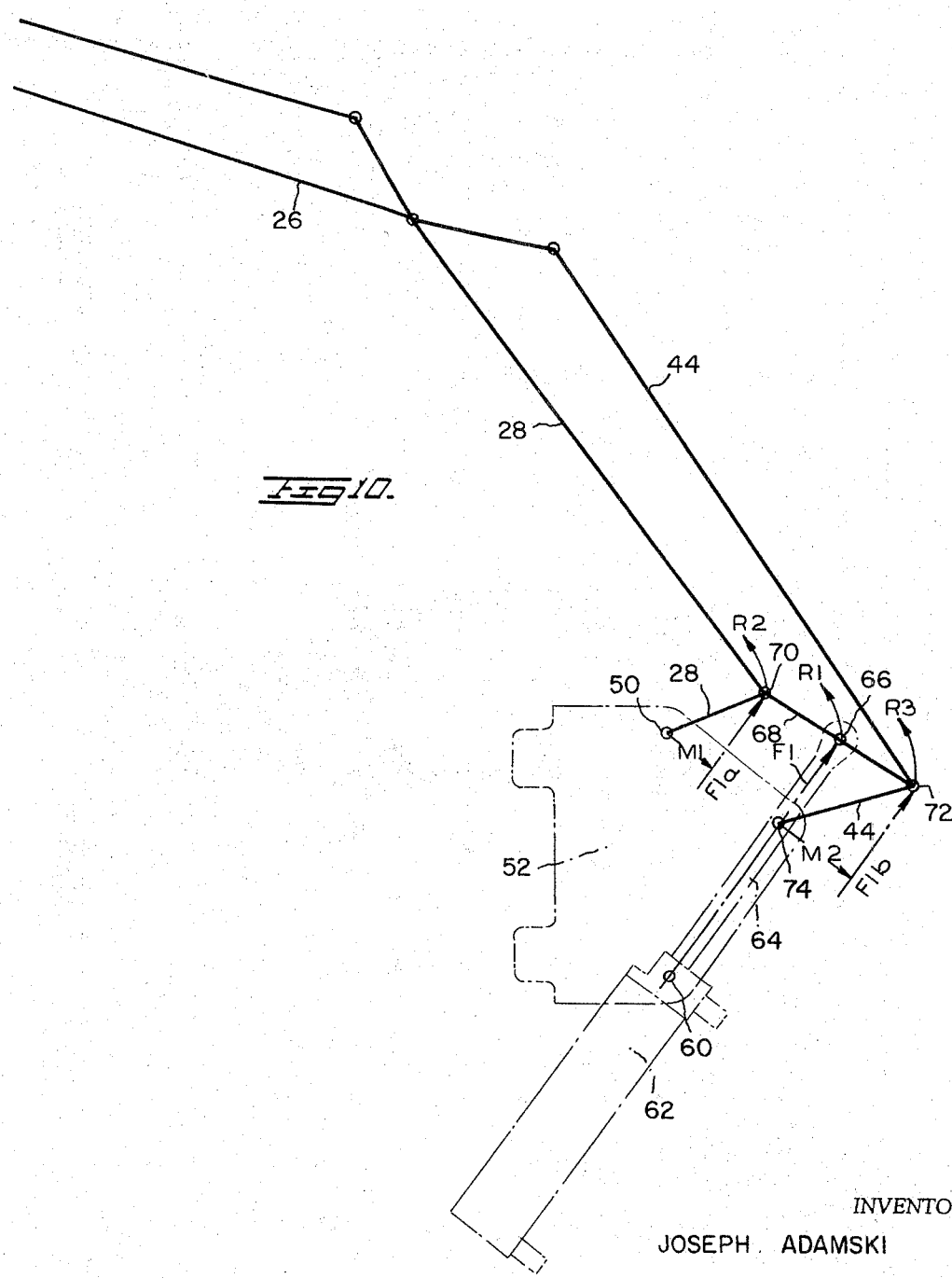

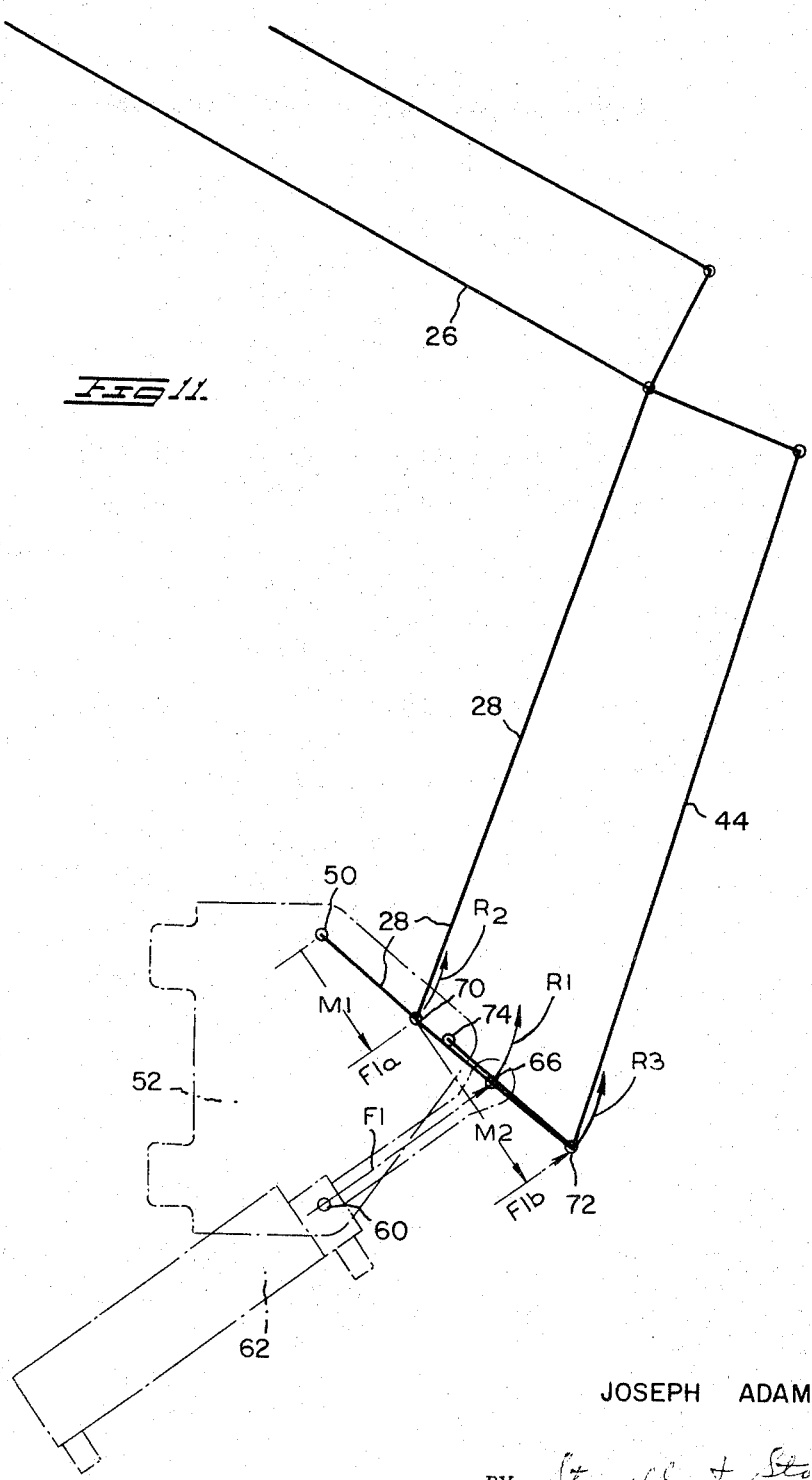

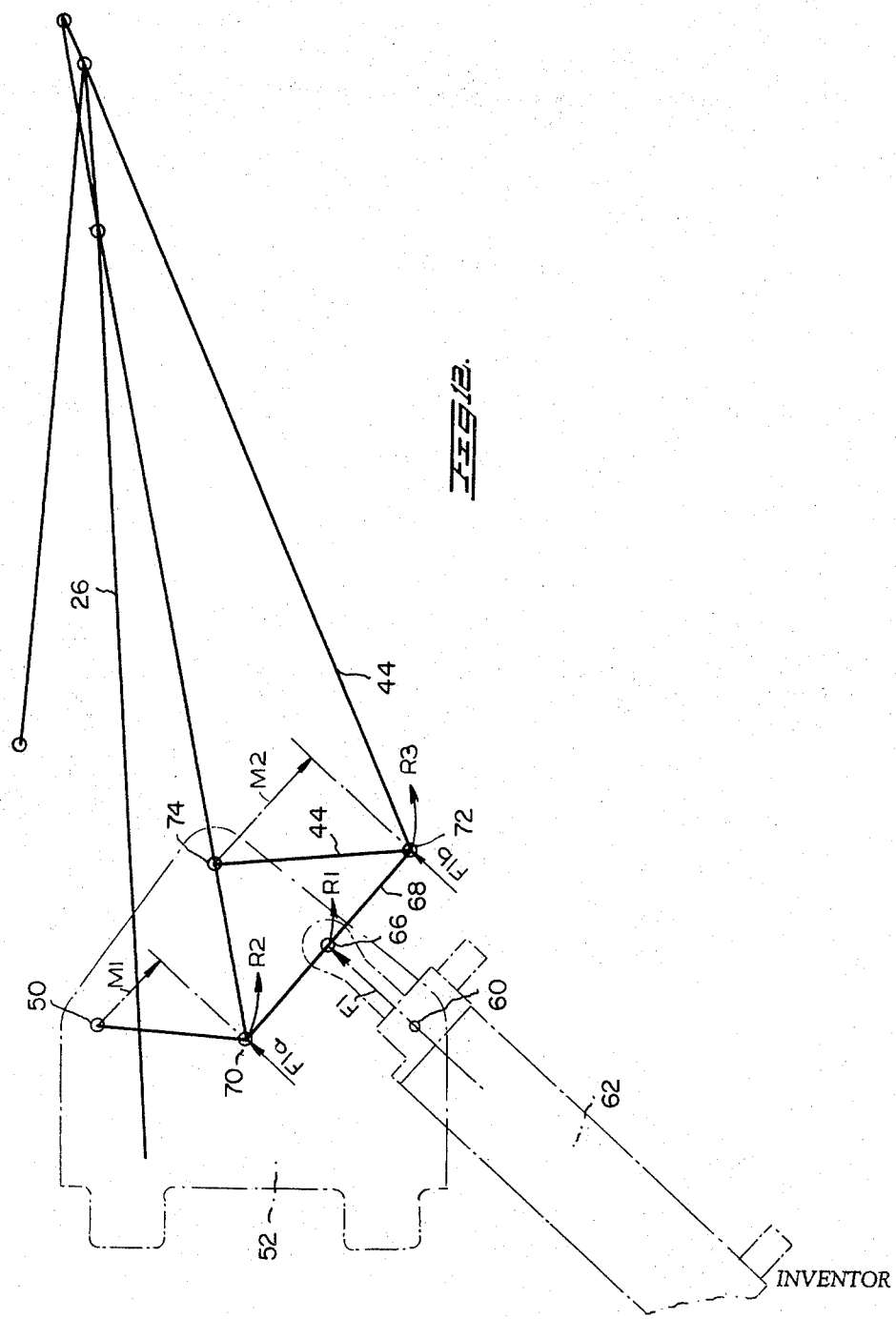

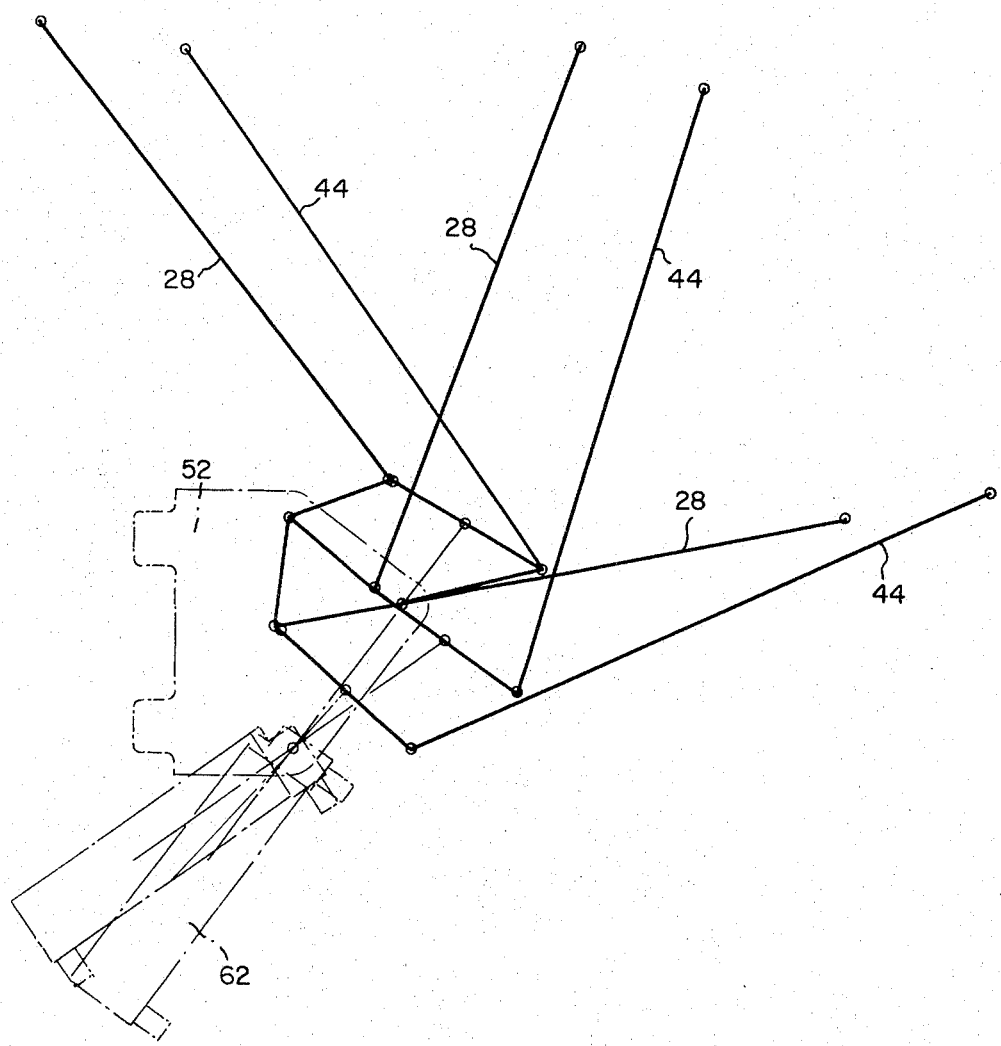

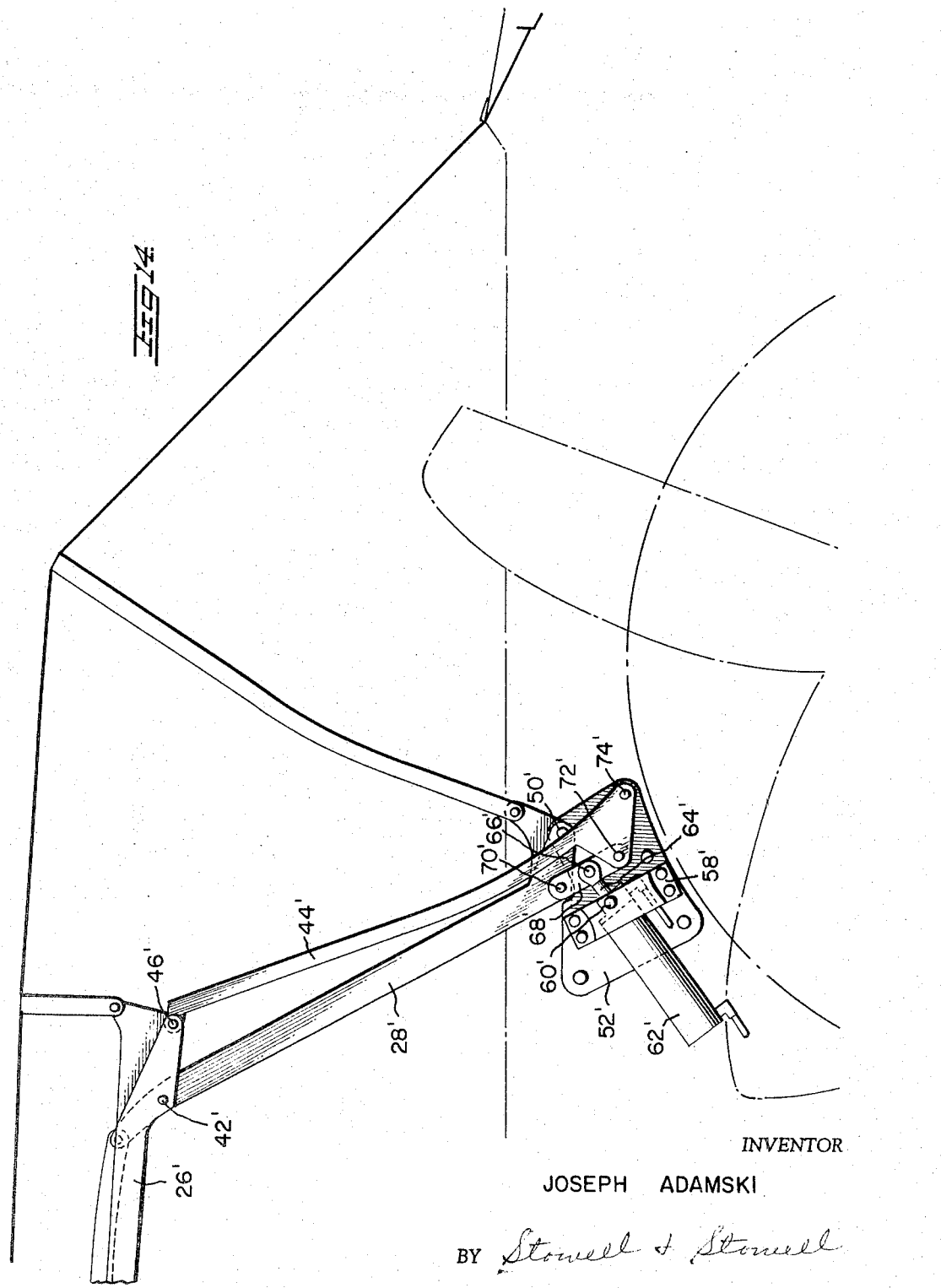

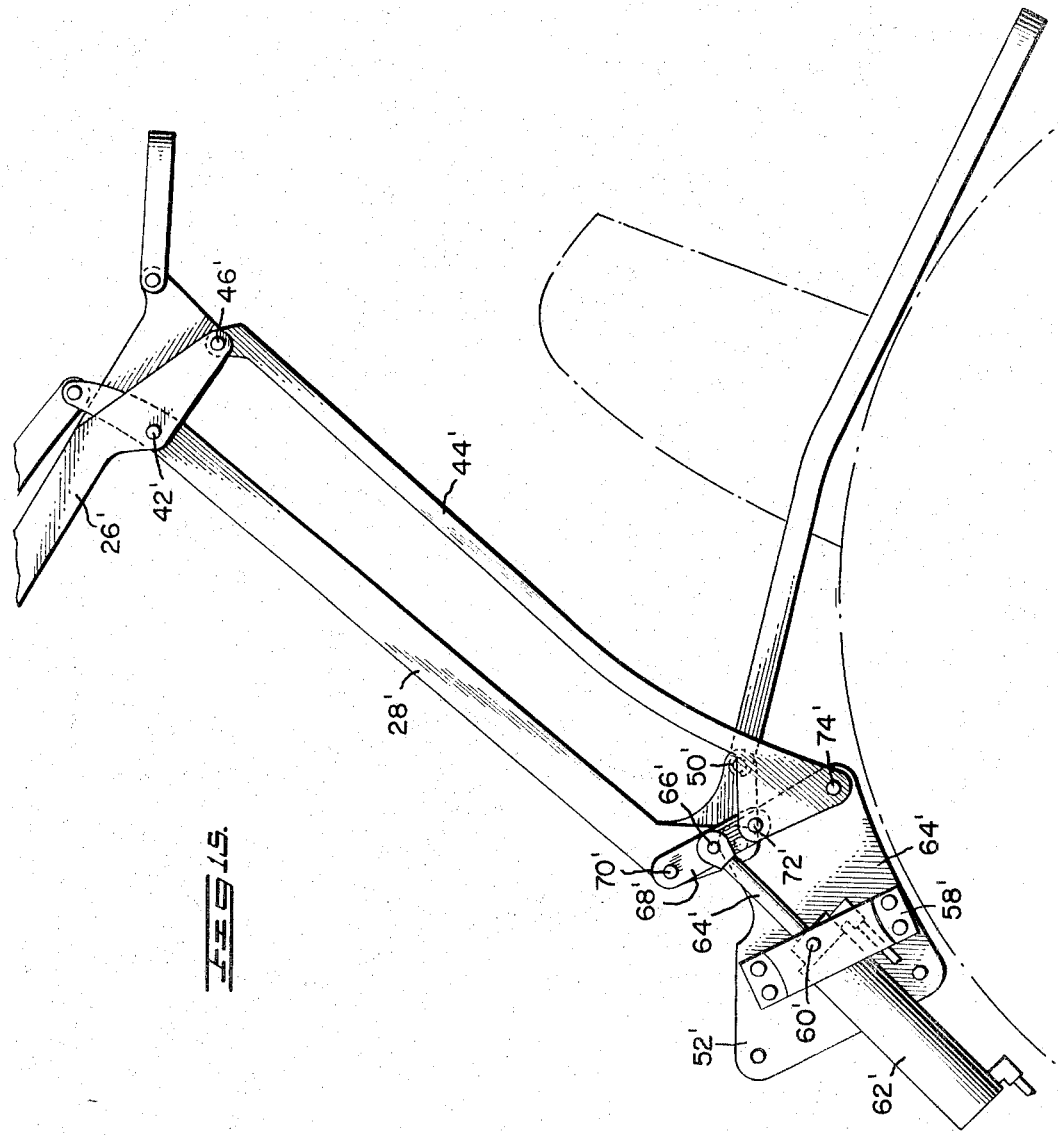

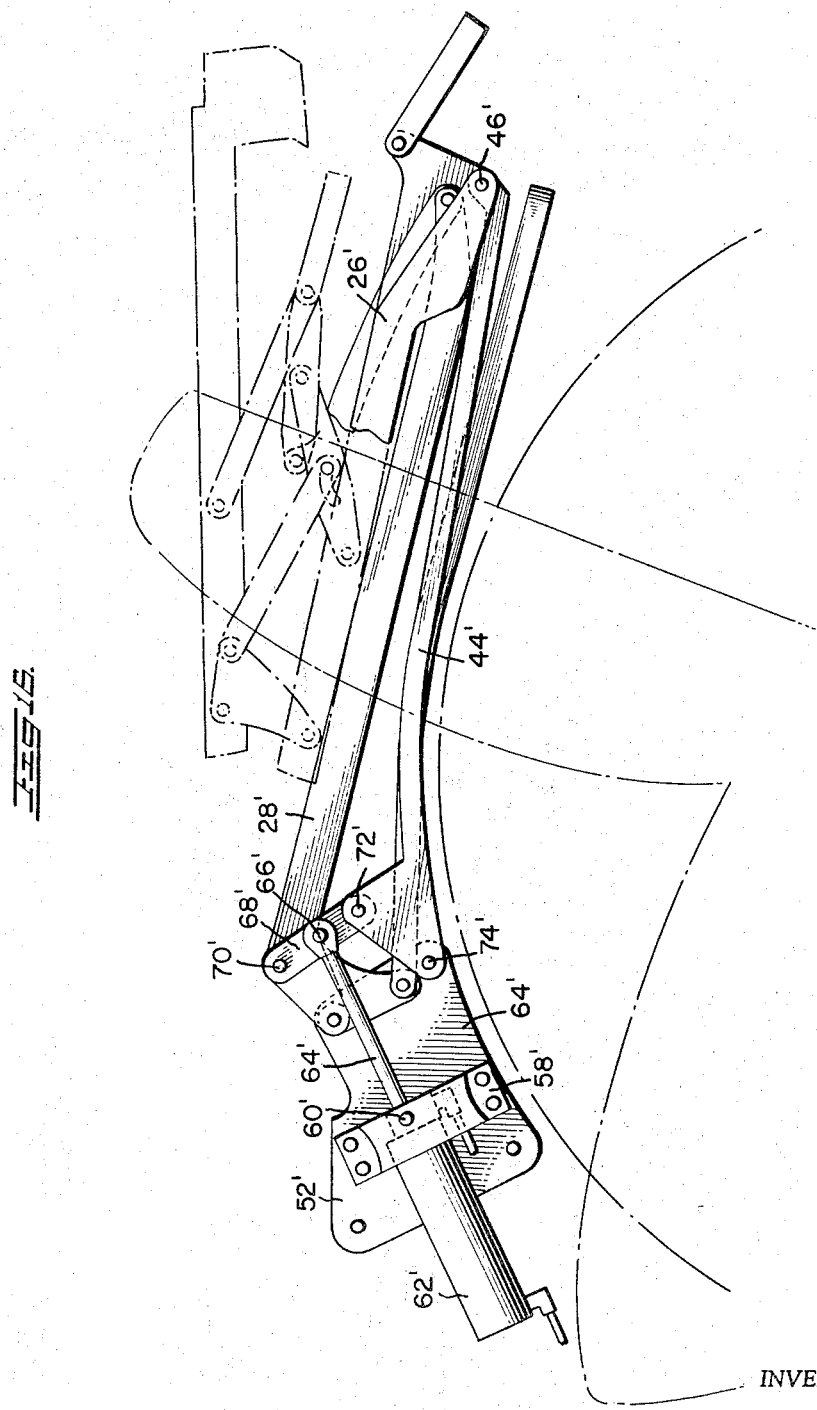

United States Patent Office 3,342,524
Patented Sept. 19, 1967

3,342,524
CONVERTIBLE TOP MECHANISM
Joseph Adamski, Brooklyn, Mich., assignor to Dura Corporation, Oak Park, Mich., a corporation of Michigan
Filed Feb. 14, 1966, Ser. No. 527,296
6 Claims. (Cl. 296—117)

This invention relates to an improved top mechanism for vehicles.

It is a current practice in vehicle body design to lower the window or belt line of all vehicles including convertibles. As the belt line of vehicles is lowered, it is necessary to increase the degree of travel of the folding top mechanism from its open position to its fully folded position if the top, when folded, is to be recessed below the vehicle belt line.

It is also the current practice to employ heavy hard glass windows in convertible tops instead of flexible lightweight plastic windows generally employed in the past. The additional weight and the necessity for storing the hard glass, without folding, when the top is folded adds to the increased degree of travel of a folding top mechanism and in the power requirements of the top actuators.

It is therefore an object of the present invention to provide a folding top mechanism which moves through an arc substantially greater than 90° and wherein the swinging motion of a pivotally mounted linear actuator for the top is minimized during the folding and unfolding of the top mechanism.

Other objects of the present invention are to provide means for simultaneously directing power to the rear rail and to the control link of the convertible top actuating mechanism; wherein the swinging arc of the actuator is divided to both sides of a line drawn from the lower pivot of the rear rail to the lower pivot of the control link and wherein the position of the linear actuator is essentially at a right angle to such a line and is disposed in the body of the vehicle away from the wheel house surfaces to provide desired clearances.

Another object of the present invention is to provide mechanism wherein the linear actuator directs power to both the rear rail and the control link through a wide arc of travel of said members without excessive reduction of the force moments at the extreme ends of travel of said linkage.

Another object is to provide a power actuated convertible top mechanism wherein the distribution of force moments, in either extreme of the actuator travel is substantially uniform to thereby accommodate an extremely long and heavy top including hard-glass windows therefor.

Another object is to provide convertible top linkage arrangement wherein the internal tensing of certain of the linkage members, when the top is in the folded position, is brought about by placing the power link, interconnecting the rear rail and the control link, in tension rather than compression as in the prior art mechanism.

It is a further object of the present invention to provide such mechanism having relatively low power requirements and wherein the linear actuator has a relatively short distance of travel.

Other objects of this invention are to provide a folding top structure for a convertible motor vehicle which is relatively simple in construction, light in weight, easy to assemble and may be installed as a pre-adjusted sub-assembly in a vehicle body.

These and other objects and advantages are in part provided by a folding top mechanism for vehicles including a front rail and a center rail articulately interconnected, a rear rail, means pivotally connecting said rear rail to said center rail, a vehicle mounted bracket, means pivotally connecting the lower end of said rear rail to said vehicle mounted bracket, a control link, means pivotally connecting one end of said control link to said center rail, means pivotally connecting the other end of the control link to the vehicle mounted bracket for pivotal movement about an axis spaced from the pivotal axis between the rear rail and said bracket, a swing link, means pivotally connecting one end of the swing link to the rear rail and the other end to the control link adjacent the pivotal connections between the rear rail and the bracket and the control link and the bracket, a linear actuator, means pivotally connecting one end of the linear actuator to the swing link intermediate its ends, means pivotally mounting another portion of the linear actuator to the bracket such that a line through the two pivotal connections on said linear actuator is generally normal to a line through the pivotal connections at the ends of the swing link, said pivotal connections at the ends of the swing link being so positioned relative to the pivotal mountings of the rear rail and the bracket and the control link and the bracket that a line through the pivots at the ends of the swing link is substantially parallel to a line through the pivotal connections between the bracket and the control link and the rear rail and on opposite sides thereof during movement of the top between its extended and retracted positions.

The invention will be more fully described and other objects and advantages will be apparent from the following detailed description of the invention when considered in light of the drawings, wherein:

FIGURE 1 is a vertical section through one side of the operating linkage of a convertible top shown in the extended position with certain portions of the vehicle body omitted and other portions shown in phantom;

FIGURE 2 is a similar view of the convertible top shown in FIGURE 1 with the top illustrated in an intermediate operative position;

FIGURE 3 is a view similar to that shown in FIGURES 1 and 2 with the top illustrated in a rearward folded position;

FIGURE 4 is a similar view of the convertible top showing the top in planned view in a folded position;

FIGURE 5 is a fragmentary view on line 5—5 of FIGURE 1;

FIGURE 6 is an enlarged fragmentary view on line 6—6 of FIGURE 1;

FIGURE 7 is an enlarged fragmentary view on line 7—7 of FIGURE 1;

FIGURE 8 is an enlarged fragmentary view on line 8—8 of FIGURE 1;

FIGURE 9 is an enlarged fragmentary section on line 9—9 of FIGURE 1;

FIGURE 10 is a diagrammatic view illustrating the forces on the primary members of a convertible top mechanism constructed in accordance with the teachings of the present invention;

FIGURE 11 is a diagrammatic view similar to that shown in FIGURE 10 with the top mechanism in a partially retracted position;

FIGURE 12 is a diagrammatic view similar to that shown in FIGURE 10 with the top mechanism in a fully retracted position;

FIGURE 13 is a diagrammatic view illustrating the primary forces and relationship between the primary members of the top mechanism in plural positions of movement;

FIGURE 14 is an enlarged fragmentary view of a modified form of the present invention showing a top actuating mechanism in the fully extended position;

FIGURE 15 is an enlarged fragmentary view of the structure shown in FIGURE 14 with the mechanism in an intermediate partially folded position; and FIGURE 16 is a view of the structures shown in FIGURES 14 and 15 with the top linkage in the fully folded position.

Referring to the drawings in further detail, and FIGURES 1 through 9 in particular, a vehicle body 10 is shown in phantom outline and is provided with a folding top 12 which is shown as erected and extended thereover.

The vehicle body 10 is shown sufficiently to identify the windshield 14 having a header bar 16 and a rear seat 18 behind which is provided the trunk area and space 20 receptive of the folding top 12 in its fully retracted and stored position. The vehicle belt line 22 and rear wheel housing 23 are also shown and identified for general reference purpose.

In the subsequent discussion of the folding top 12 and the operative mechanism thereof, reference made to the "forward" or "rearward" disposition of any member, or the use of like terms, is to be understood as with regard to the position thereof with respect to the front or back ends of the vehicle 10 on which the top is provided.

The top structure 12 includes articulated side frame rails and interconnected cross-bows which form a framework over which a fabric cover is extended. The side frame rails are each made up of a front side frame rail section 24, a center side frame rail section 26 and a rear side frame rail section 28. The articulated side frame rails are symmetrically opposite and are power operated by actuating means 30.

As will be appreciated, the actuating means 30 are interconnected for synchronous operation and are mounted on the vehicle body.

The front side rail sections 24 have a top header 32 provided across their forward ends and formed for engagement with the windshield header bar 16. A pivot plate member 34 is connected to the rear end of the front side rail section 24 and to the forward end of the center rail section 26. The pivot plate is triangular in shape with spaced pivot connections 36 and 38 for engagement with the front and center side rail sections 24 and 26, respectively, and with a third pivotal connection 40 disposed apart therefrom for connection to an operating link in a manner described in my Patent 3,180,675, dated Apr. 27, 1965.

The center side rail section 26 is connected to the pivot plate 34, as mentioned, and includes a pivotal connection 42 near its rear end providing engagement with the rear side rail section 28. A control link 44 is engaged to the rearmost end of the center side rail section 26 by means of the pivotal connection 46.

The rear side rail section 28 is pivotally connected to the center rail section 26 at 42, as mentioned, and is formed to provide a generally downwardly disposed end 48 which is pivotally connected at 50 to a support bracket 52.

The support structure 52 is generally U-shaped in transverse cross section and fasteners 54 attach the support structure 52 to the inner surface of a weldment of the vehicle body structure. The U-shaped bracket 52 includes plate 58 which is attached to the bracket 52 by fasteners and this extension forms a yoke and trunnion pivot support 60 for the hydraulic cylinder 62 which serves as the linear power actuator.

The power cylinder 62 may be much smaller than previous cylinders used for like purposes since the disclosed top makes better use of the power applied thereto. Further advantage is obtained in mounting the smaller cylinder on the bracket 52 and having its trunnion supported at its upper end. Aside from enabling the cylinder to be positioned for a shorter and more productive work stroke, this avoids the floor or frame connection and makes the actuator part of the top assembly. This, in turn, enables preadjustment of the complete top assembly and subsequent installation as a unit in a vehicle body.

The piston rod 64 of cylinder 62 is pivotally connected to a swing link assembly 68 as at 66.

The swing link assembly 68 is generally rectangular in side view and for better force transfer consists of an identical pair of elements 68a and 68b as more clearly shown in FIGURES 5, 8 and 9. Further, the link assembly is pivotally connected at 70 to the rear rail 28, at a point rearwardly and upwardly of the pivotal connection 50 between the rear rail section and the support bracket 52. This connection is offset from the pivotal connection 42 between the rear rail section 28 and center rail section 26 as more clearly shown in FIGURE 5 of the drawings. The swing link assembly 68 is also pivotally connected at 72 to the control link 44 and this connection is also offset as illustrated in FIGURE 5. It will be particularly noted that pivotal connection 72, between the swing link assembly and the control link, is positioned rearwardly of the pivotal connection between the piston rod 64 and the swing link assembly.

The lower end of the control link 44 is pivotally connected to the support bracket 52, as at 74, in spaced relation to the connection of the rear frame side rail section 28 thereto.

The assembly also includes a stabilizer link 75. The stabilizer link 75 has one end connected to pivot pin 72 which connects the swing link assembly 68 to the control link and the other end is connected to bracket 52 at 77, coaxial with pin 74 which connects the control link 44 to said bracket 52.

The power cylinders 62 are activated by control means in the passenger compartment which are not specifically shown. Such control means place in operation a fluid pump and motor 80 operatively connected by fluid lines 82 to the power cylinders 62. The fluid cylinders 62 are of the double-acting type permitting their piston rods 64 to be controlled for either extension or retraction of the folding top.

Referring now to particular parts of the folding top operating framework in greater detail:

Referring to the drawings, and in particular to FIGURE 3, which shows the top in its fully retracted and stored position, it will be seen that the center rail section 26 is folded toward the rear rail section 28 to an extent that the most forwardly end thereof overlaps the rear rail section at the rear rail section's pivotal connection 50 to the bracket member 52. In this position a straight line drawn from the pivotal connection 50 to the axis of pivotal connection 46 between the center rail section and the control link 44 shows that the pivot pin 42 has rotated below the line to thereby create a toggle or lock-out connection which resists any radial forces which would tend to urge the forward and center rail sections into their extended positions. This is particularly true if the force tending to extend said members is applied to the control link 44, which in some of the prior art folding top mechanisms, is initially responsible for lifting the forward and center rail sections from their folded positions.

With the assembly of the present invention, in order to urge the top mechanism from its fully retracted position to an extended position, the rear rail section 28 must be radially moved about its pivot 50 to release pivotal connection 42 from its toggle lock-out position described above. Since the control link 44 is constrained from any radial motion by the same toggle lock-out system, application of power to the swing link assembly 68, at point 66, causes the swing link assembly 68 to move upwardly and rearwardly, thereby substantially vertically extending the forward and center rail sections with substantially little movement of the rear rail section 28. After the pivot 42 is carried radially out of its toggle lock-out position and passes beyond the straight line position mentioned hereinabove, the control link 44 and the rear rail commence to rotate about their pivotal connections to the bracket 52 to thereby move to the position illustrated in, for example, FIGURE 2.

Referring to FIGURES 10, 11, 12 and 13, there is illustrated diagrammatically, the primary static and dynamic forces and positions and directions of movement of the primary linkages of the improved convertible top assembly of the invention.

Referring specifically to FIGURE 10, wherein reference characters corresponding to those employed in FIGURES 1–9 have been used throughout, the structures are illustrated in the roof fully extended position. (In the following description of drawings 10–13 particular attention should be directed to the substantially rectilinear movement of the swing link assembly 68, the relatively slight pivotal movement of the piston 62, and the fact that the swing link assembly 68 moves from a position above a line through pivot points 50 and 72 when the roof is fully erected to a position substantially equidistant below said straight line when the roof is fully retracted through an intermediate position substantially on said straight line when the roof is in a position intermediate its folded and its extended position.) With the roof substantially fully extended as illustrated in FIGURE 10, application of force F1 to pivotal connection 66, between the piston rod 64 and swing link assembly 68 results in force F1a upon pivot 70 at moment M1 and force F1b upon pivot 72 at moment M2. These forces F1a and F1b urge pivot 70 to rotational tendency R2 about pivot 50 and pivot 72 to R3 about pivot 74 respectively. Pivot 66 is urged along path R1 compatibly with rotational tendencies R2 and R3. It will be particularly noted that the moments M1 and M2 are substantial and providing ample force for lifting the heavy elongated roof structure from the windshield header when the forces and their moments are reversed during retraction of the roof.

Referring to FIGURE 11 with the roof in its intermediate position, substantially at a point where gravity becomes increasingly effective in assisting the lowering of the roof onto the windshield header, a discourse of the forces and associated force moments and the resultant rotational tendencies is identical to that in the preceding paragraph relative to FIGURE 10. It is also particularly noted that in the illustrated position of the roof a line between pivotal connections 50 and 74 connecting the rear rail section and the control link respectively to the support bracket 72, is substantially co-planar with the center line of the swing link assembly.

Referring to FIGURE 12 illustrating the roof in its fully retracted position, it will be seen that the swing link assembly 68 has passed substantially below the said straight line connecting pivots 50 and 74 to a distance substantially equal to the distance above the said straight line designating the position of the swing link assembly 68 when the roof is in the fully extended position. In extending the roof, from its fully retracted and illustrated position, force F1 acting on swing link 68, at pivot 66, creates forces F1a and F1b at moments M1 and M2 respectively to thereby create rotational tendencies R1, R2 and R3 about pivots 66, 70 and 72 respectively. It will be noted that the forces available for the initial lift-off of the roof structure from its fully retracted position, are again substantial. The substantially rectilinearly movement of the swing link assembly 68 is very clearly illustrated in FIGURE 13 together with the relatively short pivotal movement of the pivotally mounted ram cylinder 62. By keeping to a minimum the pivotal movement of the ram cylinder 62 the available passenger room in the rear seat of the vehicle is increased. Also, the relatively short stroke of the linear actuator is clearly illustrated in this figure.

FIGURE 13 also illustrates the fact the line of force of the linear actuator is maintained substantially at right angles to the swing link assembly whereby both the control link and the rear rail are substantially uniformly powered for actuation throughout the folding and unfolding movements of the structure.

The principles of this invention are also fully accomplished in a form of construction wherein the swing link assembly is located below the line connecting the pivotal connections between the rear rail and the control link and the mounting bracket when the roof is extended and above the said line when the roof is retracted. This arrangement is particularly advantageous as will become more apparent hereinafter in that where a linear actuator of the hydraulic ram type is emloyed the ram piston rod is in the retracted position when the roof is extended. Since a substantial part of the time convertible roofs are in the extended position, having the piston rod in the retracted position protects it from dust, dirt and corrosion. In prior art structures when the roofs are extended and the piston rods are extended during the winter months the collection of dirt, grime and corrosion sometimes renders the structures inoperable the following summer.

This modified form of the invention is illustrated in FIGURES 14, 15 and 16. In FIGURES 14, 15 and 16 like parts are designated with primed reference characters corresponding to those employed in the description of FIGURES 1 through 13. In FIGURES 14, 15 and 16 the rear rail section 28' is pivotally mounted at 50' to the support bracket 52', while the control link 44' is pivotally connected to the bracket 52' at pivot 74'. Power is directed substantially uniformly to each of the members 28' and 44' by the swing link assembly 68' having end pivotal connection 70' to the rear rail section 28' and connection 72' to the control link 44'. The piston rod end is pivotally connected at pivot 66' substantially centrally of the swing link assembly 68'. Further, the hydraulic cylinder 62' is pivotally secured at 60' by a plate 58' which in turn is rigidly connected to the bracket 52'. It will be noted in viewing FIGURES 14, 15 and 16 that the line of force application between the piston rod 64' and the swing link assembly 68' is substantially at right angles throughout the entire movement of the roof linkages from the extended to the retracted positions. Further, it will be seen that when the roof is fully extended the line between pivotal connection 70', 66' and 72' is below a line joining pivots 50' and 74' connecting the rear rail section 28' and the control link 44' to the support bracket 52'.

When the roof structures are in an intermediate position the said two lines are parallel and coincide, while when the roof is in the fully retracted position said line passing through the pivotal connections 70' and 72' is positioned above a line passing through the pivotal connections 50' and 74' between the rear rail section 28' and the bracket 52' and the control link 44' and said bracket 52'.

Separate force diagrams, for the form of the invention illustrated in FIGURES 14, 15 and 16, are not included as said force diagrams would be substantially the same as the diagrams illustrated in FIGURES 10, 11 and 12, whereby all of the advantageous features of the form of the invention illustrated in FIGURES 1–13 are fully accomplished by the form of the invention illustrated in FIGURES 14, 15 and 16 and in addition, as hereinbefore described, the form of the invention illustrated in FIGURES 14, 15 and 16 has the added advantage that the ram piston rod is retracted when the roof is extended.

From the foregoing description of the various forms of the improved roof assembly it will be seen that the present invention fully accomplishes the aims and objects hereinbefore set forth. It will be apparent to those skilled in the art that various modifications may be made in the form of structures specifically illustrated herein without departing from the scope of the appended claims.

I claim:

1. In a convertible top operating mechanism for automotive vehicles including a front rail, and a center rail articulately interconnected, a rear rail, means pivotally connecting said rear rail to said center rail, a vehicle mounted bracket, means pivotally connecting the lower end of said rear rail to said vehicle mounted bracket, a control link, means pivotally connecting one end of said control link to said center rail, means pivotally connecting the other end of the control link to the vehicle mounted bracket for pivotal movement about an axis spaced from the pivotal axis between the rear rail and said bracket, a swing link, means pivotally connecting one end of the swing link to the rear rail and the other end to the control link adjacent the pivotal connections between the rear rail and the bracket and the control link and the bracket, a linear actuator, means pivotally connecting one end of the linear actuator to the swing link intermediate its ends, means pivotally mounting another portion of the linear actuator to the bracket such that a line through the two pivotal connections on said linear actuator is generally normal to a line through the pivotal connections at the ends of the swing link, said pivotal connections at the ends of the swing link being so positioned relative to the pivotal mountings of the rear rail and the bracket and the control link and the bracket that a line through the pivots at the ends of the swing link is substantially parallel to a line through the pivotal connections between the bracket and the control link and the rear rail and on opposite sides thereof during movement of the top between its extended and retracted positions.

2. The operating mechanism defined in claim 1 wherein the swing link is above the said line through the pivotal connections between the bracket and the control link and the rear rail when the top is fully extended.

3. The operating mechanism defined in claim 1 wherein the swing link is below the said line through the pivotal connections between the bracket and the control link and the rear rail when the top is fully extended.

4. The invention defined in claim 3 wherein the linear actuator is a hydraulic ram and the ram rod thereof is fully retracted when the top is fully extended.

5. The invention defined in claim 1 including a stabilizer link, means pivotally mounting one end of the stabilizer link comprises a pair of members mounted in spaced the swing link and means pivotally connecting the other end of the stabilizer link to the vehicle mounted bracket.

6. The invention defined in claim 1 wherein the swing link comprises a pair of members mounted in spaced parallel relation and wherein the linear actuator is pivotally mounted between said pair of members.

References Cited

UNITED STATES PATENTS

| | | | |
|---|---|---|---|
| 3,180,675 | 4/1965 | Adamski | 296—117 |
| 3,251,625 | 5/1966 | Adamski | 296—117 |
| 3,263,515 | 8/1966 | Adamski | 296—117 X |
| 3,297,357 | 1/1967 | Adamski | 296—117 |

BENJAMIN HERSH, *Primary Examiner.*

C. C. PARSONS, *Assistant Examiner.*

UNITED STATES PATENT OFFICE
CERTIFICATE OF CORRECTION

Patent No. 3,342,524　　　　　　　　　　　　September 19, 1967

Joseph Adamski

It is hereby certified that error appears in the above numbered patent requiring correction and that the said Letters Patent should read as corrected below.

Column 8, lines 8 and 9, strike out "comprises a pair of members mounted in spaced the swing link" and insert instead -- to the pivotal connection between the control link and the swing link --.

Signed and sealed this 24th day of September 1968.

(SEAL)
Attest:

Edward M. Fletcher, Jr.　　　　　　　　　　EDWARD J. BRENNER
Attesting Officer　　　　　　　　　　　　　Commissioner of Patents